United States Patent
Tsai et al.

(10) Patent No.: US 7,468,638 B1
(45) Date of Patent: Dec. 23, 2008

(54) TRANSMIT/RECEIVE SWITCH DEVICE

(75) Inventors: King Chun Tsai, San Jose, CA (US);
Weijun Yao, Mountain View, CA (US);
Dong Hun Shin, Wonju-si (KR)

(73) Assignee: Marvell International Ltd., Hamilton (BM)

( * ) Notice: Subject to any disclaimer, the term of this patent is extended or adjusted under 35 U.S.C. 154(b) by 45 days.

(21) Appl. No.: 11/765,041

(22) Filed: Jun. 19, 2007

Related U.S. Application Data

(60) Provisional application No. 60/815,361, filed on Jun. 20, 2006.

(51) Int. Cl.
*H03B 5/00* (2006.01)
(52) U.S. Cl. .................. 331/126; 455/323
(58) Field of Classification Search ......... 331/124–126, 331/134; 455/323, 333
See application file for complete search history.

(56) References Cited

U.S. PATENT DOCUMENTS

| | | | |
|---|---|---|---|
| 6,366,168 B1 | 4/2002 | Zheng et al. | |
| 6,366,622 B1 * | 4/2002 | Brown et al. | 375/322 |
| 6,606,489 B2 * | 8/2003 | Razavi et al. | 455/323 |
| 6,683,512 B2 * | 1/2004 | Nakamata et al. | 333/126 |
| 6,977,553 B1 | 12/2005 | Jin et al. | |
| 7,088,187 B1 | 8/2006 | Jin et al. | |

OTHER PUBLICATIONS

Yeh et al., "Design and Analysis for a Miniature CMOS SPDT Switch Using Body-Floating Technique to Improve Power Performance," *IEEE Transactions on Microwave Theory and Techniques*, 54(1), pp. 31-39, Jan. 2006.

Fanucci et al., "A Novel Fully Integrated Antenna Switch for Wireless Systems," 33rd Conference on European Solid-State Device Research, 2003 (ESSDERC '03), pp. 553-556, 2003.

Ohnakado et al., "A 0.8dB Insertion-Loss, 23dB Isolation, 17.4dBm Power-Handling, 5GHz Transmit/Recive CMOS Switch," *IEEE 2003 Radio Frequency Integrated Circuits Symposium*, pp. 229-232, 2003.

Talwalker et al., "Integrated CMOS Transmit-Receive Switch Using LC-Tuned Substrate Bias for 2.4-GHz and 5.2-GHz Applications," *IEEE Journal of Solid-State Circuits*, 39(6), pp. 863-870, Jun. 2004.

* cited by examiner

*Primary Examiner*—Don P Le

(57) ABSTRACT

An integrated transmit/receive (T/R) switch device comprises a substrate, an antenna port to couple with an antenna, a transmitter port to couple with a transmitter, and a receiver port to couple with a receiver. A receive path is provided between the antenna port and the receiver port, and a transmit path is provided between the antenna port and the transmitter port. The transmit path includes a first transistor on the substrate, and the first transistor is coupled in series between the antenna port and the transmitter port. A body node of the first transistor is unconnected, and the substrate is configured to provide a high impedance path from the first transistor to a reference voltage. A second transistor on the substrate is coupled in series between the receiver port and the reference voltage.

33 Claims, 8 Drawing Sheets

PRIOR ART

TRANSMIT/RECEIVE SWITCH DEVICE

CROSS-REFERENCE TO RELATED APPLICATION

The present application claims the benefit of U.S. Provisional Application No. 60/815,361, entitled "BAZA TRANSMITTER AND RECEIVER SWITCH," filed on Jun. 20, 2006, which is hereby incorporated by reference herein in its entirety.

FIELD OF TECHNOLOGY

The present disclosure relates generally to wireless communication systems and, more particularly, to radio frequency switch circuits that enable the sharing of a single antenna among transmitter and receiver stages.

DESCRIPTION OF THE RELATED ART

In many wireless communication devices, a single antenna is used for both transmission and reception. In some of these devices, the antenna is time shared (e.g., time-division multiplexed) between the transmitter and the receiver (transceiver). Often, radio frequency (RF) switches are used to isolate the transmission path from the receiver path so that the device is not damaged. FIG. 1 is a block diagram of an example prior art front end 100 of a transceiver that utilizes a single antenna 104. The antenna 104 is coupled to a transmit/receive (T/R) switch device 108 via a band pass filter 112 and a matching network 116. The T/R switch device 108 is also coupled to an input of a low noise amplifier (LNA) 120 via a matching network 124. An output of the LNA 120 is provided to a receiver. Additionally, the T/R switch device 108 is coupled to an output of a power amplifier (PA) 128 via a matching network 132. An input of the PA 128 is coupled to a transmitter. During transmission, the T/R switch device 108 couples the PA 128 to the antenna 104. Additionally, the T/R switch device 108 isolates the LNA 120 from the PA 128 to protect the LNA 120. Further, the matching network 132 matches the impedance of the PA 128 with that of the T/R switch device 108. During reception, the T/R switch device 108 couples the antenna 104 to the LNA 120. Also, the T/R switch device 108 isolates the LNA 120 from the PA 128 to reduce insertion loss and degradation in linearity. Further, the matching network 132 matches the impedance of the T/R switch device 108 with that of the LNA 120. During both transmission and reception, the matching network 116 matches the impedance of the T/R switch device 108 with that of the band pass filter 112/antenna 104.

Typically, RF switch devices, such as the T/R switch device 108, are implemented as discrete components on a board, whereas much of the transceiver may be integrated on one or more integrated circuit chips. For example, RF switches are implemented as discrete Micro Electro-Mechanical Systems (MEMS), Pseudomorphic High Electron Mobility Transistor (PHEMT), p-type, intrinsic, n-type (PIN) diodes, or GaAs Metal Semiconductor Field Effect Transistor (MESFET) devices. In addition to a potentially significant increase in the cost of manufacturing, the use of such external RF switches has several other drawbacks. For example, isolation of the receiver path from the transmission path is often less than optimal, which leads to a degradation in transmission power. Additionally, using switches external to the transceiver IC(s) increases insertion loss and non-linearity, which in turn lead to a loss of sensitivity.

Previous attempts to integrate the RF switches onto an IC were not successful in meeting performance specifications necessary in most wireless applications. For example, many CMOS RF switch implementations are not able to meet linearity requirements at typical transmitter power levels.

FIG. 2 is a circuit diagram of a prior art CMOS T/R switch device 150. The T/R switch device 150 includes a multifinger nMOS transistor 154 coupled in series between an antenna/band pass filter (BPF) port 156 and a PA port 158. Additionally, a multifinger nMOS transistor 160 is coupled in series between an LNA port 162 and ground, and a matching network 164 couples the antenna/BPF port 156 with the LNA port 162. The matching network 164 comprises a capacitor 166, a capacitor 168, and an inductor 170. The capacitor 166 is coupled between the antenna/BPF port 156 and ground, and the capacitor 168 is coupled between the LNA port 162 and ground. The inductor 170 is coupled between the antenna/BPF port 156 and the LNA port 162.

A resistor 172 couples a gate of the transistor 154 to a TX_EN port 174, and a resistor 176 couples a gate of the transistor 160 to the TX_EN port 174. A resistor 178 also couples the gate of the transistor 160 to ground. A resistor 180 couples the PA port 158 to a TX_ENB port 182, and a resistor 184 couples the LNA port 162 to the TX_ENB port 182.

An LC-tank circuit 186 is coupled between a substrate node of the transistor 154 and ground. The LC-tank circuit 186 includes a capacitor 188 coupled between the substrate node of the transistor 154 and ground, and an inductor 190 coupled between the substrate node of the transistor 154 and ground. A substrate node of the transistor 160 is coupled to ground.

Operation of the prior art T/R switch device 150 will now be described. In a transmit mode, a TX_EN signal coupled to the TX_EN port 174 is set to a $V_{DD}$, and a TX_ENB signal coupled to the TX_ENB port 182 is set to ground. In response, the transistor 154 and the transistor 160 are turned on. Because the transistor 154 is on, there is a low impedance path between the PA port 158 and the antenna/BPF port 156. Additionally, because the transistor 160 is turned on, the drain of the transistor 160 is pulled to ground, helping to protect the LNA. Additionally, the capacitor 166 and the inductor 170 act as a parallel tank circuit. The values of the capacitor 166 and the inductor 170 are selected so that the tank circuit they form resonates at a frequency of operation of the transmitter. This causes the receiver path to present a high impedance. Thus, most of the power of the signal from the PA goes to the antenna, as opposed to the receive path.

The gate voltage of the transistor 154 is bootstrapped by the source/drain voltages. But as will be apparent to those of ordinary skill in the art, voltage swings that exceed $V_{DD}$ may still lead to performance problems with a pass transistor such as the transistor 154. For example, with large voltage swings, parasitic source and drain junction diodes can turn on and distort the signal from the PA. Additionally, with the parasitic source and drain junction diodes on, transconductance modulation may cause further distortion. Also, with the parasitic source and drain junction diodes on, a large amount of current may flow into the substrate. To alleviate these problems, the body of the transistor 154 could be biased with a resistor, but this may cause latchup problems, as is well known to those of ordinary skill in the art.

As shown in FIG. 2, the LC-tank circuit 186 is utilized to bias the body of the transistor 154. The values of the capacitor 188 and the inductor 190 are chosen so that the LC-tank circuit 186 resonates at the frequency of the transmitter, and thus, the LC-tank circuit 186 presents a high impedance at that frequency (approximately 2,000 ohms). Because, the parasitic junction diodes are connected to the high-impedance LC-tank circuit 186, the deleterious effects of the parasitic junction diodes are reduced. At the same time, latchup is avoided. During transmit mode, a large AC voltage may be applied to the PA port 158 without causing any two terminals of the transistor 154 to develop a voltage difference greater than $V_{DD}$.

Even with the LC-tank circuit 186, there is a layout dependent parasitic resistance from the substrate of the transistor 154 to the nearest substrate ground contact. This parasitic resistance can be modeled as a resistance in parallel with the impedance of the LC-tank circuit 186. Thus, the nearest ground contact was placed at least 200 micrometers away from the transistor 154 in order to increase this resistance.

In receive mode, the TX_EN signal is set to ground, and the TX_ENB signal is set to $V_{DD}$. In response, the transistor 154 and the transistor 160 are turned off. Thus, the transistor 154 isolates the PA from the antenna. Additionally, the matching network 164 matches the impedance of the antenna to the impedance of the LNA. Additionally, because the drain of the transistor 154 and the drain of the transistor 160 are biased to $V_{DD}$, the parasitic drain capacitance of these transistors is minimized.

SUMMARY OF THE DISCLOSURE

In one embodiment, an integrated transmit/receive (T/R) switch device comprises a substrate, an antenna port to couple with an antenna, a transmitter port to couple with a transmitter, and a receiver port to couple with a receiver. Additionally, the T/R switch device comprises a receive path between the antenna port and the receiver port, and a transmit path between the antenna port and the transmitter port. The transmit path includes a first transistor on the substrate, and the first transistor is coupled in series between the antenna port and the transmitter port. A body node of the first transistor is unconnected, and the substrate is configured to provide a high impedance path from the first transistor to a reference voltage. Further, the T/R switch device comprises a second transistor on the substrate, the second transistor coupled in series between the receiver port and the reference voltage.

In another embodiment, another T/R switch device comprises a substrate, an antenna port to couple with an antenna, a transmitter port to couple with a transmitter, and a receiver port to couple with a receiver. Also, the T/R switch device comprises a receive path between the antenna port and the receiver port, and a transmit path between the antenna port and the transmitter port. The transmit path includes a first transistor on the substrate, and the first transistor is coupled in series between the antenna port and the transmitter port. Additionally, the T/R switch device comprises an isolation network coupled between a drain of the first transistor and a source of the first transistor, wherein the isolation network is configured to present a high impedance, at least at a frequency range of operation of the receiver. Further, the T/R switch device comprises a second transistor on the substrate, the second transistor coupled in series between the receiver port and a reference voltage.

In yet another embodiment, another T/R switch device comprises a substrate, an antenna port to couple with an antenna, a transmitter port to couple with a transmitter, and a receiver port to couple with a receiver. Additionally, the T/R switch device comprises a receive path between the antenna port and the receiver port, and a transmit path between the antenna port and the transmitter port. The transmit path includes a first transistor on the substrate, and the first transistor is coupled in series between the antenna port and the transmitter port. The T/R switch also comprises a second transistor on the substrate, and the second transistor is coupled in series between the receiver port and a reference voltage. Further, the T/R switch comprises a diode circuit coupled between a drain of the second transistor and the reference voltage, and a biasing circuit to bias the diode circuit when the second transistor is on.

In still another embodiment, a communication device includes a transmitter having an output, and a power amplifier having an input coupled to the output of the transmitter, and having an output. Also, the communication device includes a low noise amplifier having an input and an output, and a receiver having an input coupled to the output of the low noise amplifier. Additionally, the communication device includes an antenna, and a transmit/receive switch having a first port coupled to the input of the low noise amplifier, a second port coupled to the output of the power amplifier, and a third port coupled to the antenna. The transmit/receive switch comprises a substrate, a receive path between the third port and the first port, and a transmit path between the third port and the second port. The transmit path includes a first transistor on the substrate, the first transistor coupled in series between the third port and the second port, wherein a body node of the first transistor is unconnected, and wherein the substrate is configured to provide a high impedance path from the first transistor to a reference voltage. The transmit/receive switch also comprises a second transistor on the substrate, the second transistor coupled in series between the first port and the reference voltage.

In yet another embodiment, another communication device includes a transmitter having an output, and a power amplifier having an input coupled to the output of the transmitter, and having an output. The communication device additionally includes a low noise amplifier having an input and an output, and a receiver having an input coupled to the output of the low noise amplifier. Further, the communication device includes an antenna, and a transmit/receive switch having a first port coupled to the input of the low noise amplifier, a second port coupled to the output of the power amplifier, and a third port coupled to the antenna. The transmit/receive switch comprises a substrate, a receive path between the third port and the first port, and a transmit path between the third port and the second port. The transmit path includes a first transistor on the substrate, the first transistor coupled in series between the third port and the second port. The transmit/receive switch also comprises an isolation network coupled between a drain of the first transistor and a source of the first transistor, wherein the isolation network is configured to present a high impedance, at least at a frequency range of operation of the receiver. The transmit/receive switch further comprises a second transistor on the substrate, the second transistor coupled in series between the first port and a reference voltage.

In still another embodiment, another communication device includes a transmitter having an output, and a power amplifier having an input coupled to the output of the transmitter, and having an output. The communication device additionally includes a low noise amplifier having an input and an output, and a receiver having an input coupled to the output of the low noise amplifier. Further, the communication device includes an antenna, and a transmit/receive switch having a first port coupled to the input of the low noise amplifier, a second port coupled to the output of the power amplifier, and a third port coupled to the antenna. The transmit/receive switch comprises a substrate, a receive path between the third port and the first port, and a transmit path between the third port and the second port. The transmit path includes a first transistor on the substrate, the first transistor coupled in series between the third port and the second port. The transmit/receive switch additionally comprises a second transistor on the substrate, the second transistor coupled in series between the receiver port and a reference voltage. The transmit/receive switch also comprises a diode circuit coupled between a drain of the second transistor and the reference voltage, and a biasing circuit to bias the diode circuit when the second transistor is on.

DETAILED DESCRIPTION

Figure 3:
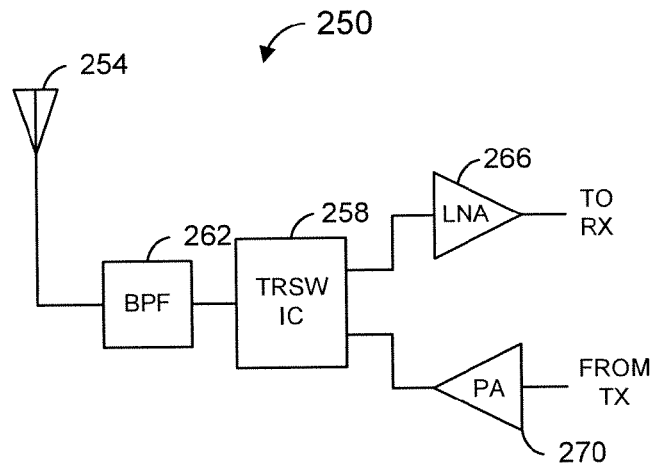
FIG. 3 is a block diagram of an example front-end for a transceiver that utilizes a single antenna.

FIG. 3 is a block diagram of an example front end 250 of a transceiver that may utilize an example transmit/receive (T/R) switch to be described in more detail below. The front end 250 can be utilized in a variety of wireless communication devices such as wireless network cards, wireless access points, wireless routers, cellular telephones, personal digital assistants (PDAs) having wireless communication capability, etc. The front end 250 may include an antenna 254 coupled to a T/R switch device 258 via a band pass filter 262. As described above, the T/R switch device 258 may be implemented using standard CMOS fabrication techniques, and thus may be implemented as an integrated circuit (IC). The T/R switch device 258 may be coupled to an input of a low noise amplifier (LNA) 266 and may be coupled to an output of a power amplifier (PA) 270. During transmission, the T/R switch device 258 may couple the PA 270 to the antenna 254. Additionally, the T/R switch device 258 may isolate the LNA 266 from the PA 270 to protect the LNA 266. Further, the T/R switch device 258 may match the impedance of the PA 270 with that of the band pass filter 262/antenna 254. During reception, the T/R switch device 258 may couple the antenna 254 to the LNA 266, and may isolate the LNA 266 from the PA 270 to reduce insertion loss and degradation in linearity. Further, the T/R switch device 258 may match the impedance of the band pass filter 262/antenna 254 with that of the LNA 266.

The T/R switch device 258 may be implemented as a standalone IC or it may be integrated with another IC of the transceiver. For instance, the LNA 266 may be implemented on an IC, and the T/R switch device 258 may be implemented on this IC. Similarly, the PA 270 may be implemented on an IC, and the T/R switch device 258 may be implemented on this IC. Also, the LNA 266 and the PA 270 may be implemented on one IC, and the T/R switch device 258 may be implemented on this IC as well.

Figure 1:
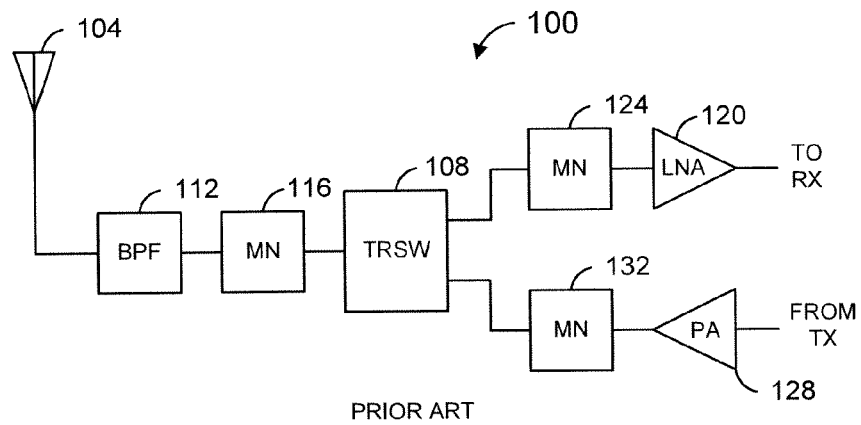
FIG. 1 is a block diagram of a prior art front-end for a transceiver that utilizes a single antenna.
Figure 2:
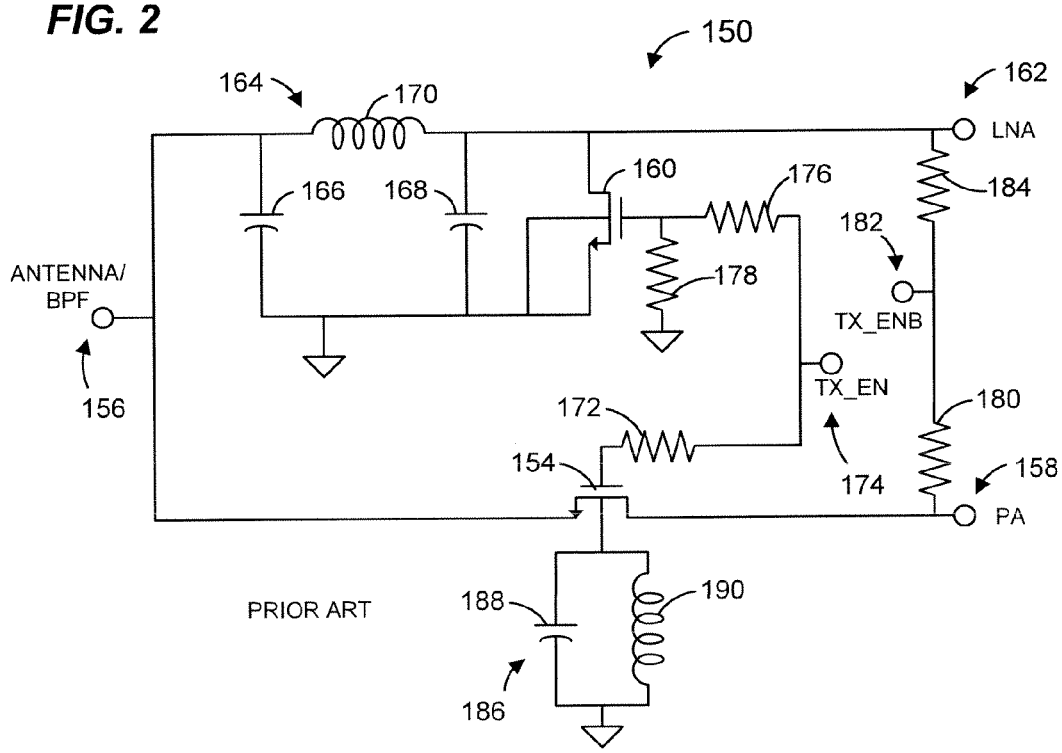
FIG. 2 is a circuit diagram of a prior art transmit/receive switch corresponding to the prior art front-end of FIG. 1.

Comparing the front end 250 with the prior art front end 100 of FIG. 1, it can be seen that the T/R switch device 258 may potentially help eliminate several external components from the front end portion of a transceiver. For example, the T/R switch device 258 itself may be implemented on an IC. Additionally, it can be seen that the front end 250 does not require external matching networks such as the matching networks 112, 124, and 132 of the front end 100. Thus, the T/R switch device 258 potentially may reduce costs associated with a transceiver. Additionally, as will be described in more detail below, the T/R switch device 258 potentially may increase performance of a transceiver.

Figure 4:
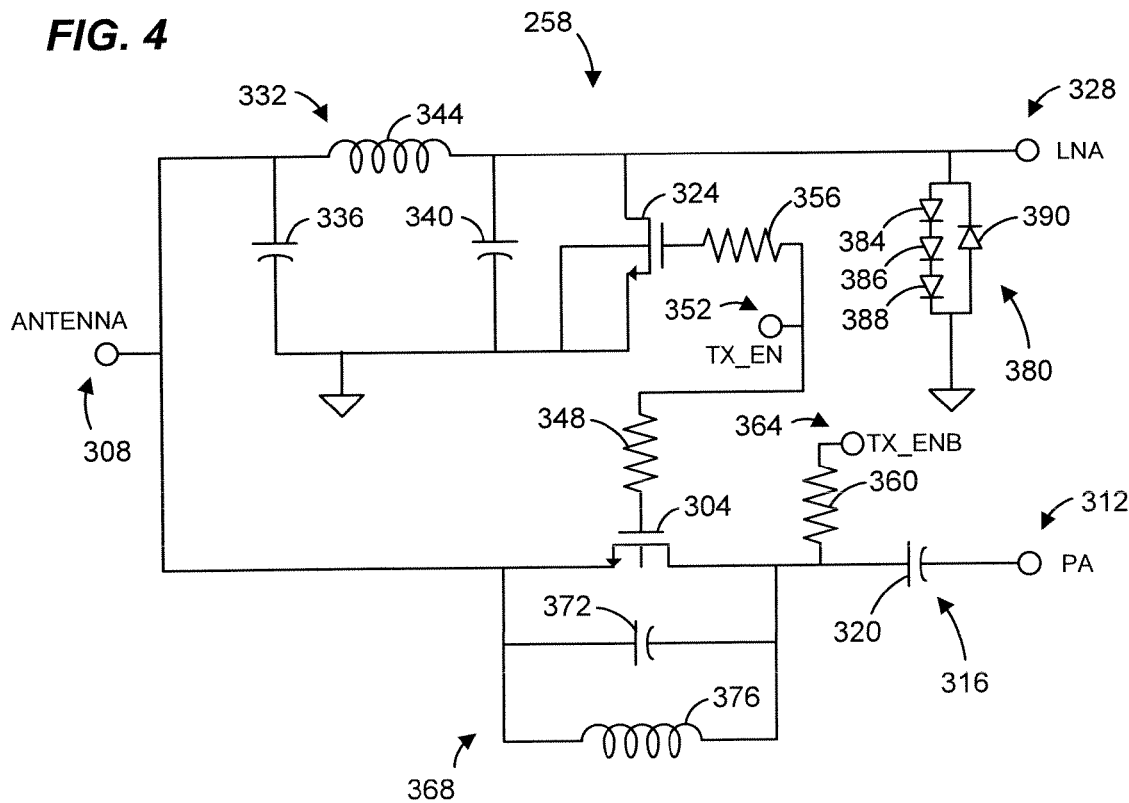
FIG. 4 is a circuit diagram of an example transmit/receive switch that can be utilized with the example front end of FIG. 3.

FIG. 4 is a circuit diagram of the example T/R switch device 258. The T/R switch device 258 is a single-pole, double-throw switch device. The T/R switch device 258 may include an NMOS transistor 304 coupled in series between an antenna port 308 and a PA port 312. In particular, a matching network 316 may be coupled between a drain of the transistor 304 and the PA port 312. The matching network 316 may comprise a capacitor 320 coupled in series between the drain of the transistor 304 and the PA port 312. Referring to FIG. 3, the antenna port 308 may be coupled to the antenna 254 via the band pass filter 262, and the PA port 312 may be coupled to an output of the PA 270. The T/R switch device 258 may also include an NMOS transistor 324 coupled in series between an LNA port 328 and ground, and a matching network 332 may couple the antenna port 308 with the LNA port 328. A body node of the transistor 324 may be coupled to ground. The matching network 332 may comprise a capacitor 336, a capacitor 340, and an inductor 344. The capacitor 336 may be coupled between the antenna port 308 and ground, and the capacitor 340 may be coupled between the LNA port 328 and ground. The inductor 344 may be coupled between the antenna port 308 and the LNA port 328. The transistor 304 may be referred to as a series switch and the transistor 324 may be referred to as a shunt switch.

A resistor 348 may couple a gate of the transistor 304 to a TX_EN port 352, and a resistor 356 may couple a gate of the transistor 324 to the TX_EN port 352. A resistor 360 may couple a drain of the transistor 304 to a TX_ENB port 364.

An LC-tank circuit 368 may be coupled between a source of the transistor 304 and the drain of the transistor 304. The LC-tank circuit 368 may include a capacitor 372 and an inductor 376 coupled in parallel between the source and the drain of the transistor 304. A body node of the transistor 304 may be left unconnected.

A diode circuit 380 may be coupled between the LNA port 328 and ground. The diode circuit 380 may comprise a diode 384, a diode 386, and a diode 388 coupled in series between the LNA port 328 and ground. In particular, the anode of the diode 384 is coupled to the LNA port 328, and the cathode of the diode 384 is coupled to the anode of the diode 386.

Similarly, the cathode of the diode 386 is coupled to the anode of the diode 388, and the cathode of the diode 388 is coupled to ground. The diode circuit 380 may also comprise a diode 390, parallel to the diodes 384, 386, and 388, and coupled between the LNA port 328 and ground in direction opposite to the diodes 384, 386, and 388. In particular, the anode of the diode 390 is coupled to ground and the cathode of the diode 390 is coupled to the LNA port 328.

Operation of the T/R switch device 258 will now be described. In a transmit mode, a TX_EN signal coupled to the TX_EN port 352 may be set to a $V_{DD}$, and a TX_ENB signal coupled to the TX_ENB port 364 may be set to ground. In response, the transistor 304 and the transistor 324 are turned on, and the drain of the transistor 304 is biased to ground. Because the transistor 304 is on, there is a low impedance path between the PA port 312 and the antenna/BPF port 308. Further, the matching network 316 helps to match the output impedance of the PA 270 with the impedance of the antenna 254/BPF 262. Additionally, because the transistor 324 is turned on, the drain of the transistor 324 is pulled to ground, helping to protect the LNA 266. Additionally, the capacitor 336 and the inductor 344 act as a parallel tank circuit. The values of the capacitor 336 and the inductor 344 may be selected so that the tank circuit they form resonates at a frequency within a range of operation of the transmitter. This causes the receiver path to present a high impedance within the range of operation of the transmitter. Thus, most of the power of the signal from the PA 270 goes to the antenna 254, as opposed to the LNA port 328.

Figure 5:
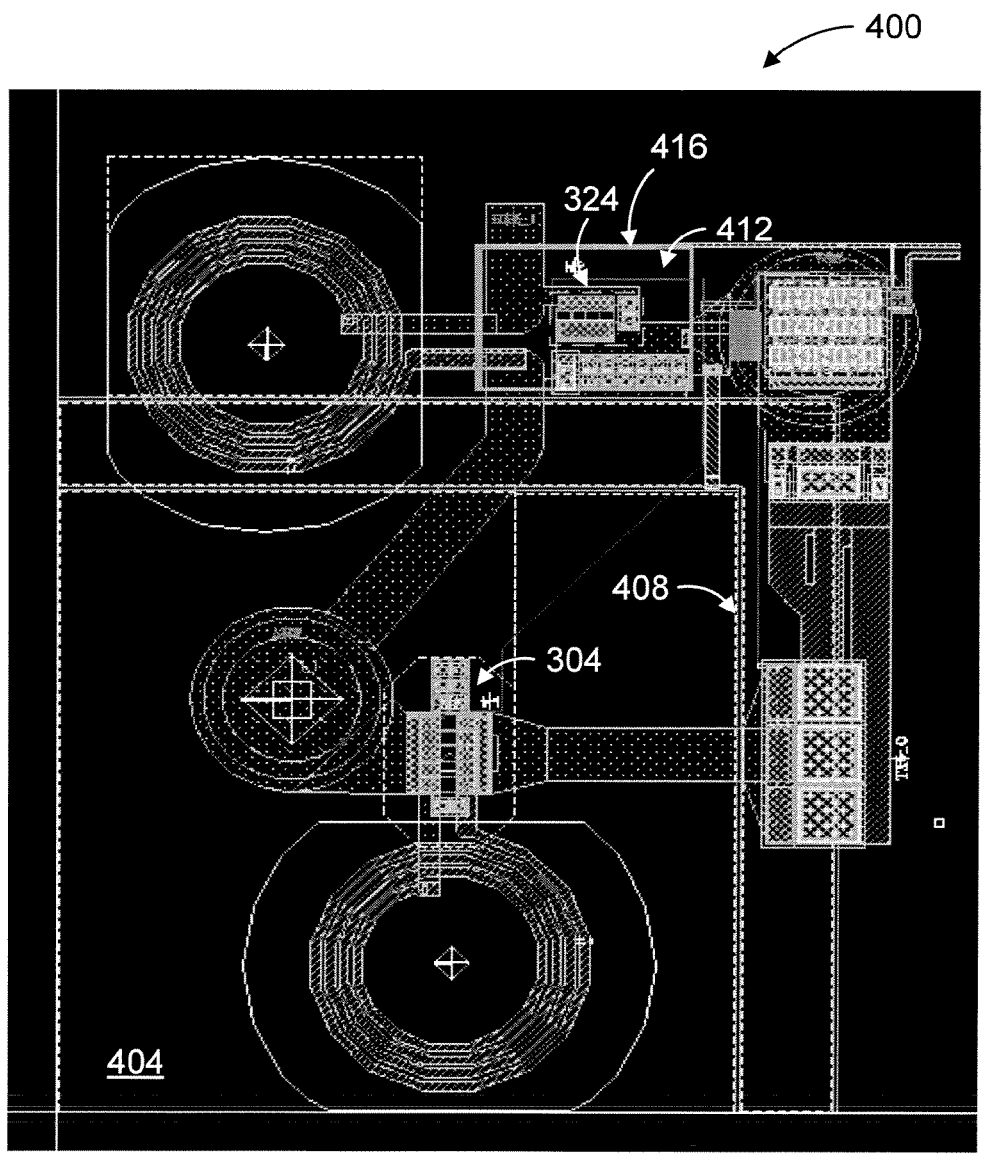
FIG. 5 is an illustration of an example layout of the example transmit/receive switch of FIG. 4.

As described above, the body node of the transistor 304 is left unconnected. To assist in bootstrapping the gate voltage, the drain voltage, the source voltage, and the body voltage of the transistor 304 and to help prevent latchup, the parasitic body resistance of the transistor 304 may be increased by isolating the transistor 304 on the IC. FIG. 5 is a diagram of an example IC layout 400 of the T/R switch device 258. The transistor 304 is located in a generally square-shaped substrate portion 404. The substrate portion 404 may be without any portions having a low-impedance coupling to ground (referred to hereinafter as a "low impedance point"). This results in an increased parasitic resistance between the body of the transistor 304 and ground. In this example, there is at least a 300 micrometer distance from the transistor 304 to any low impedance point. In general, the required distance from the transistor 304 to any low impedance point will vary depending upon the resistivity of the substrate. Additionally, the IC includes a substrate guard ring 408.

It has been found that with the example layout 400 and the resulting increased parasitic resistance between the body of the transistor 304 and ground, large voltage swings greater than $V_{DD}$ at the drain of the transistor 304 during transmit mode lead only to relatively small voltage swings across the four terminals of the transistor 304. Thus, the parasitic source and drain junction diodes of the transistor 304 do not turn on, improving linearity, reducing transconductance modulation, and preventing large current flows into the substrate. At the same time, it has been found that with the example layout 400 and the resulting increased parasitic resistance between the body of the transistor 304 and ground, large voltage swings greater than $V_{DD}$ at the drain of the transistor 304 during transmit mode do not lead to latchup.

Referring again to FIG. 4, operation of the T/R switch device 258 during a receive mode will now be described. In the receive mode, the TX_EN signal may be set to ground, and the TX_ENB signal may be set to $V_{DD}$. In response, the transistor 304 and the transistor 324 are turned off. Because the transistor 304 is off, it isolates the PA 270 from the antenna 254. Additionally, the matching network 332 matches the impedance of the antenna 254/BPF 262 to the input impedance of the LNA 266.

The diode circuit 380 provides ESD protection with regard to the antenna/BPF port 308 without significant degradation in supply noise rejection. In addition, in combination of resistor 360, the diode circuit 380 allows the input of the LNA to be biased at a relatively high voltage during normal receive mode operation which helps to reduce the parasitic junction capacitance at this node.

A value of the resistor 360 may be selected to be relatively large so that only a small DC current may flow through the resistor 360, the LC-tank circuit 368, and into the diode circuit 380. Because this current is small, the drain of the transistor 304 remains above approximately 1 volt, and the parasitic drain capacitance of the transistor 304 is minimized. Similarly, because the small current flows into the diode circuit 380, the LNA port 328 is biased to above approximately 1 volt. Thus, the drain of the transistor 324 as well as the source of the transistor 304 also remain above approximately 1 volt. This biasing reduces the parasitic junction capacitance of the diode circuit 380. It also reduces the parasitic drain capacitance of the transistor 324 and the parasitic source capacitance of the transistor 304. Reducing the parasitic capacitances of the transistor 304, the transistor 324, and/or the diode circuit 380 during the receive mode helps to improve the overall performance of the receiver. For example, reducing any of these capacitances may lead to one or more of the following: improved linearity, reduced insertion loss, and/or an improved noise figure of the receiver.

Also during the receive mode, the LC-tank circuit 368 acts to further isolate the impedance of the PA 270 from the antenna 254. For instance, the values of the capacitor 372 and the inductor 376 may be selected so that the LC-tank circuit 368 resonates within a range of receive frequencies. Selection of these values may take into account the parasitic source capacitance and the parasitic drain capacitance of the transistor 304, which in effect form a parasitic capacitance coupled in parallel with the capacitor 372 and the inductor 376. Thus, the LC-tank circuit 368 acts to further improve insertion loss by presenting a high impedance with a range of receive frequencies.

As one of ordinary skill in the art will recognize, a parasitic drain to substrate capacitance of the transistor 324 may increase insertion loss. To help reduce this unwanted effect, the transistor 324 may be isolated on the IC. Referring again to FIG. 5, the transistor 324 is located in a generally rectangular-shaped substrate portion 412. The substrate portion 412 may be without any low impedance points. In general, the required distance from the transistor 324 to any low impedance point will vary depending upon the resistivity of the substrate. Additionally, the IC includes a substrate guard ring 416. It is estimated that, because of the distance between the transistor 324 and the nearest low impedance point, and because of the guard ring 416, a parasitic capacitance in series between the parasitic drain to substrate capacitance and the low impedance point is reduced. This helps to reduce the insertion loss caused by the parasitic drain to substrate capacitance of the transistor 324.

Referring again to FIG. 4, the diode circuit 380 provides electro-static discharge (ESD) protection for the antenna port 308 in both modes of operation. For example, the diode circuit 380 provides a low impedance path to ground for a current flowing from the antenna port 308. Namely, such a path is provided by the diodes 384, 386, and 388. Additionally, the diode circuit 380 provides a low impedance path from ground for a current flowing into the antenna port 308. In particular, such a path is provided by the diode 390.

As discussed above, the example T/R switch 258 can be utilized in a variety of wireless communication devices. As just one specific example, the front end 258 can be utilized in wireless communication devices compatible with the IEEE Standard 802.11a (1999) and its updates and amendments.

One of ordinary skill in the art will recognize that the example T/R switch 258 can be modified in various ways. Some example modifications will now be described with reference to FIG. 4. One of ordinary skill in the art, however, will recognize many other possible modifications. As one possible modification, a pass transistor could be added to the path between the antenna port 308 and the LNA port 328, for example. Similarly, a shunt transistor could be added between the PA port 312 and ground. Additionally, the matching network 332 could be modified. For example, an inductor could be added between the drain of the transistor 324 and ground. This may help to match the input impedance of the LNA to an antenna/BPF impedance that may be less than 50 ohms. Further, a matching network different than the matching network 316 could be utilized. Still further, the diode circuit 380 may be omitted. For example, a resistor could be used to bias the drain of the transistor 324, and a different technique for providing ESD protection, such as a currently known technique, could be utilized. As yet a further possible modification, the LC-tank circuit 368 may be omitted in certain implementations, or a different circuit could be used to help further isolated the PA during the receive mode. Moreover, although the example T/R switch 258 utilizes NMOS transistors 304 and 324, other types of transistors may be utilized. As just one example, the transistor 304 could be a PMOS transistor and/or the transistor 324 could be a PMOS transistor. Also, transistors other than MOS transistors could be utilized. Still further, although various components in the example T/R switch 258 were described as being coupled to ground, in other implementations a different reference voltage other than ground could be utilized.

Some example modifications will now be described with reference to FIG. 5. As was discussed above, in the example layout 400, the transistor 304 may be located in the generally square-shaped substrate portion 404, which includes no low impedance points and is separated from at least some other portions of the substrate by the guard ring 408. Thus, in the example layout 400, there is at least a 300 micrometer distance from the transistor 304 to any low impedance point. Optionally, during fabrication, the p-well implant may be blocked out in the portion 404 to help reduce the substrate conductance. Other processing steps may also be used to reduce substrate conductance around transistor 304 during fabrication. As another option, the guard ring 408 may be omitted. Further, the substrate portion 404 may have a different shape than a generally square shape, such as a generally rectangular shape, a generally circular shape, a generally oval shape, etc.

Additionally, in some implementations, a high substrate resistance associated with the transistor 304 may be achieved by alternative techniques. Further, other techniques for bootstrapping the terminals of the transistor 304 and avoiding latchup may be utilized with other aspects described with reference to the example T/R switch 258. For example, a deep n-well (DNW) may be utilized to separate the body of the transistor 304 from a p-substrate, and the body node of the transistor 304 may be coupled to ground by a relatively large resistor such as a 5,000 ohm resistor. In this way, the size of the T/R switch may be reduced. This technique may be utilized in conjunction with the isolation network 368 and/or the diode circuit 380, for example. Additionally, an LC-tank circuit such as the LC-tank circuit 186 of FIG. 1 could be coupled between a substrate node of the transistor 304 and ground. This technique may be utilized in conjunction with the isolation network 368 and/or the diode circuit 380, for example.

As was discussed above, in the example layout 400, the transistor 324 may be located in the generally rectangular-shaped substrate portion 412, which includes no low impedance points and is separated from at least some other portions of the substrate by the guard ring 416. Optionally, during fabrication, the p-well implant may be blocked out in the portion 412 to help reduce the substrate conductance. Other processing steps may also be used to reduce substrate conductance around transistor 304 during fabrication. As another option, the guard ring 416 may be omitted. Still further, the substrate portion 412 may have a different shape than a generally rectangular shape, such as a generally square shape, a generally circular shape, a generally oval shape, etc.

Additionally, in some implementations, a high substrate resistance associated with the transistor 324 may be achieved by alternative techniques. For example, a deep n-well (DNW) may be utilized to separate the body of the transistor 324 from a p-substrate. In this way, the size of the T/R switch may be reduced.

Still further, in some implementations, the high substrate resistance provided by the portion 412 may not be needed. For example, the increased insertion loss due to the parasitic drain to substrate capacitance of the transistor 324 may be acceptable. Alternatively, increased insertion loss due to the parasitic drain to substrate capacitance of the transistor 324 may be addressed using other techniques.

Figure 6:
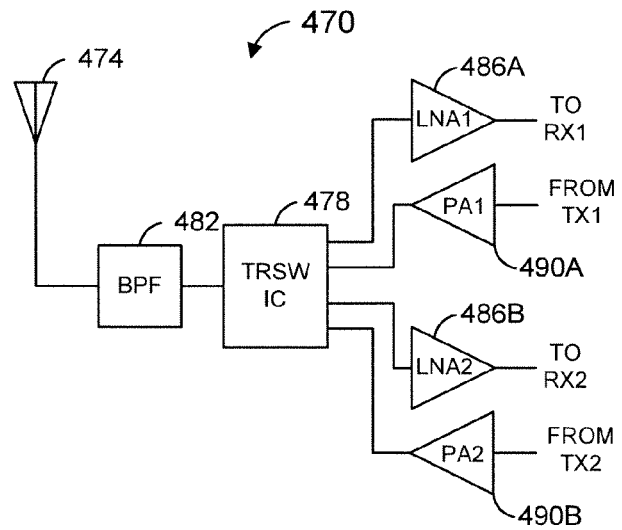
FIG. 6 is a block diagram of an example front-end for a transceiver that utilizes a single antenna, wherein the transceiver includes two transmitters and two receivers.

Although the example T/R switch device 258 is a single-pole, double-throw switch device, one of ordinary skill in the art will recognize that the techniques utilized by the T/R switch device 258 can be used with other types of switches. For example, the techniques described above may be utilized to implement a switch for a transceiver that utilizes two or more receivers and/or two or more transmitters with a single antenna. FIG. 6 is a block diagram of an example front end 470 of a transceiver having two receivers and two transmitters. The front end 470 can be utilized in a variety of wireless communication devices such as wireless network cards, wireless access points, wireless routers, cellular telephones, personal digital assistants (PDAs) having wireless communication capability, etc. As just one example, the front end 470 can be utilized in wireless communication device that implements two different communication protocols, such as the IEEE Standard 802.11a (1999) and its updates and amendments, and the IEEE Standard 802.11b.

The front end 470 may include an antenna 474 coupled to a T/R switch device 478 via a band pass filter 482. Similar to the T/R switch device 258 described above, the T/R switch device 478 may be implemented using standard CMOS fabrication techniques, and thus may be implemented as an integrated circuit (IC). The T/R switch device 478 may be coupled to an input of a first low noise amplifier (LNA1) 486A and may be coupled to an output of a first power amplifier (PA1) 490A. Also, the T/R switch device 478 may be coupled to an input of a second low noise amplifier (LNA2) 486B and may be coupled to an output of a second power amplifier (PA2) 490B. The LNA1 486A may be coupled to a first receiver (RX1), and the PA1 490A may be coupled to a first transmitter (TX1). Similarly, the LNA2 486B may be coupled to a second receiver (RX2), and the PA2 490B may be coupled to a second transmitter (TX2). The RX1 and the TX1 may operate at a first frequency band, and the RX2 and the TX2 may operate at a second frequency band different from the first frequency band. Optionally, the RX1 and the TX1 may operate in a same frequency band. For example, the first frequency band and the second frequency band may partially or completely overlap.

During transmission associated with the TX1, the T/R switch device 478 may couple the PA1 490A to the antenna 474. Additionally, the T/R switch device 478 may isolate the LNA1 486A from the PA1 490A to protect the LNA1 486A. Similarly, the T/R switch device 478 may isolate the LNA2 486B from the PA1 490A to protect the LNA2 486B. Additionally, the T/R switch device 478 may isolate the PA2 490B from the PA1 490A. Further, the T/R switch device 478 may match the impedance of the PA1 490A with that of the band pass filter 482/antenna 474.

During reception associated with the RX1, the T/R switch device 478 may couple the antenna 474 to the LNA1 486A, and may isolate the LNA1 486A from the PA1 490A to reduce insertion loss and degradation in linearity. Similarly, the T/R switch device 478 may isolate the LNA1 486A from the LNA2 486B and the PA2 490B to reduce insertion loss and degradation in linearity. Further, the T/R switch device 478 may match the impedance of the band pass filter 482/antenna 474 with that of the LNA 1 486A.

During transmission associated with the TX2, the T/R switch device 478 may couple the PA2 490B to the antenna 474. Additionally, the T/R switch device 478 may isolate the LNA2 486B from the PA2 490B to protect the LNA2 486B. Similarly, the T/R switch device 478 may isolate the LNA1 486A from the PA2 490B to protect the LNA1 486A. Additionally, the T/R switch device 478 may isolate the PA1 490A from the PA2 490B. Further, the T/R switch device 478 may match the impedance of the PA2 490B with that of the band pass filter 482/antenna 474.

During reception associated with the RX2, the T/R switch device 478 may couple the antenna 474 to the LNA2 486B, and may isolate the LNA2 486B from the PA2 490B to reduce insertion loss and degradation in linearity. Similarly, the T/R switch device 478 may isolate the LNA2 486B from the LNA1 486A and the PA1 490A to reduce insertion loss and degradation in linearity. Further, the T/R switch device 478 may match the impedance of the band pass filter 482/antenna 474 with that of the LNA2 486B.

The T/R switch device 478 may be implemented as a stand-alone IC or it may be integrated with another IC associated with one or more of the RX1, RX2, TX1, or TX2. As just one example, the LNA 486A may be implemented on an IC, and the T/R switch device 478 may be implemented on this IC.

Figure 7:
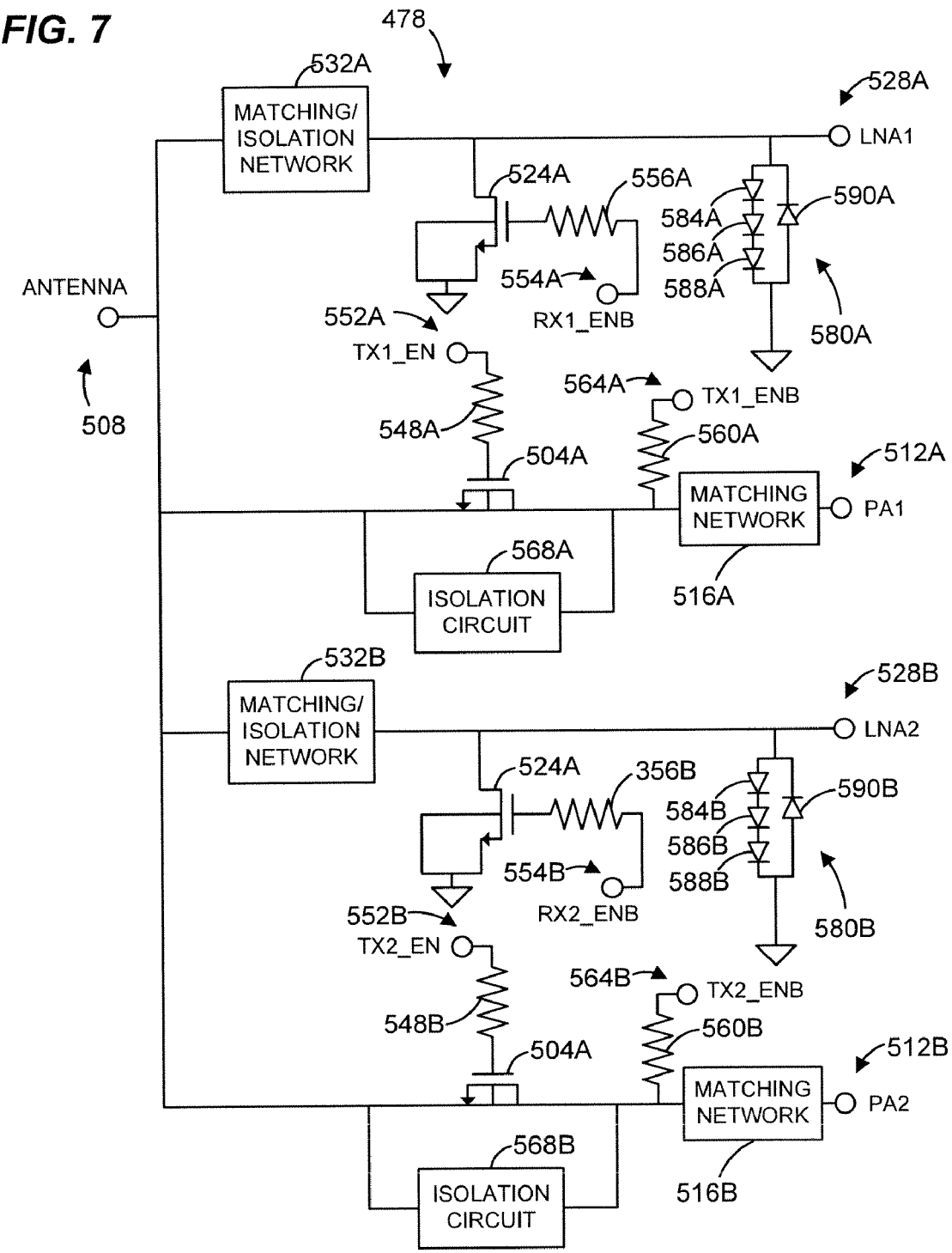
FIG. 7 is a circuit diagram of an example transmit/receive switch that can be utilized with the example front end of FIG. 6.

FIG. 7 is a circuit diagram of the example T/R switch device 478. The T/R switch device 478 may include an NMOS transistor 504A coupled in series between an antenna port 508 and a PA1 port 512A. In particular, a matching network 516A may be coupled between a drain of the transistor 504A and the PA1 port 512A. Referring to FIG. 6, the antenna port 508 may be coupled to the antenna 474 via the band pass filter 482, and the PA1 port 512A may be coupled to an output of the PA1 490A. The T/R switch device 478 may also include an NMOS transistor 524A coupled in series between an LNA1 port 528A and ground, and a matching/isolation network 532A may couple the antenna port 508 with the LNA1 port 528A. A body node of the transistor 524A may be coupled to ground.

A resistor 548A may couple a gate of the transistor 504A to a TX1_EN port 552A, and a resistor 556A may couple a gate of the transistor 524A to an RX1_ENB port 554A. A resistor 560A may couple a drain of the transistor 504A to a TX1_ENB port 564A.

An isolation circuit 568A may be coupled between a source of the transistor 504A and the drain of the transistor 504A. A body node of the transistor 504A may be left unconnected.

A diode circuit 580A may be coupled between the LNA1 port 528A and ground. The diode circuit 580A may comprise a diode 584A, a diode 586A, and a diode 588A coupled in series between the LNA1 port 528A and ground. In particular, the anode of the diode 584A is coupled to the LNA1 port 528A, and the cathode of the diode 584A is coupled to the anode of the diode 586A. Similarly, the cathode of the diode 586A is coupled to the anode of the diode 588A, and the cathode of the diode 588A is coupled to ground. The diode circuit 580A may also comprise a diode 590A, parallel to the diodes 584A, 586A, and 588A, and coupled between the LNA1 port 528A and ground in a direction opposite to the diodes 584A, 586A, and 588A. In particular, the anode of the diode 590A is coupled to ground and the cathode of the diode 590A is coupled to the LNA1 port 528A.

Additionally, the T/R switch device 478 may include an NMOS transistor 504B coupled in series between the antenna port 508 and a PA2 port 512B. In particular, a matching network 516B may be coupled between a drain of the transistor 504B and the PA2 port 512B. Referring to FIG. 6, the antenna port 508 may be coupled to the antenna 474 via the band pass filter 482, and the PA2 port 512B may be coupled to an output of the PA2 490B. The T/R switch device 478 may also include an NMOS transistor 524B coupled in series between an LNA2 port 528B and ground, and a matching/isolation network 532B may couple the antenna port 508 with the LNA2 port 528B. A body node of the transistor 524B may be coupled to ground.

A resistor 548B may couple a gate of the transistor 504B to a TX2_EN port 552B, and a resistor 556B may couple a gate of the transistor 524B to an RX2_ENB port 554B. A resistor 560B may couple a drain of the transistor 504B to a TX2_ENB port 564B.

An isolation circuit 568B may be coupled between a source of the transistor 504B and the drain of the transistor 504B. A body node of the transistor 504B may be left unconnected.

A diode circuit 580B may be coupled between the LNA2 port 528B and ground. The diode circuit 580B may comprise a diode 584B, a diode 586B, a diode 588B, and a diode 590B arranged in a manner similar to the diode circuit 590A, but coupled between the LNA2 port 528B and ground. Optionally, one of the diode circuits 580A or 580B may be omitted.

Each of the transistors 504A and 504B may be located in a layout in a manner similar to that described above with respect to the transistor 304 of FIGS. 4 and 5. For example, each of the transistors 504A and 504B may be located in a portion of substrate similar to the portion 404 describe above with respect to FIG. 5. Similarly, each of the transistors 524A and 524B may be located in a layout in a manner similar to that described above with respect to the transistor 324 of FIGS. 4 and 5. For example, each of the transistors 524A and 524B may be located in a portion of substrate similar to the portion 412 describe above with respect to FIG. 5.

Operation of the T/R switch device 478 will now be described. In a first transmit mode (i.e., TX1 transmitting), a TX1_EN signal coupled to the TX1_EN port 552A may be set to a $V_{DD}$, and a TX1_ENB signal coupled to the TX1_ENB port 564A may be set to ground. Also, an RX1_ENB signal coupled to the RX1_ENB port 554A may be set to $V_{DD}$. Further, a TX2_EN signal coupled to the TX2_EN port 552B may be set to ground, and a TX2_ENB signal coupled to the TX2_ENB port 564B may be set to $V_{DD}$. Additionally, an RX2_ENB signal coupled to the RX2_ENB port 554B may be set to $V_{DD}$. In response, the transistor 504A and the transistor 524A are turned on, and the drain of the transistor 504A is biased to ground. Because the transistor 504A is on, there is a low impedance path between the PA1 port 512A and the antenna/BPF port 508. Further, the matching network 516A helps to match the output impedance of the PA1 with the impedance of the antenna 474/BPF 482. Additionally, because the transistor 524A is turned on, the drain of the transistor 524A is pulled to ground, helping to protect the LNA1. Additionally, the matching/isolation network 532A may be configured to further isolate the LNA1 port 528A. For example, the matching/isolation network 532A may be configured to present a high impedance within a range of operation of the TX1, the RX2, and/or the TX2 when the drain of the transistor 524A is pulled to ground. Similarly, the transistor 504B is turned off and the transistor 524B is turned on. Because the transistor 504B is off, the PA2 port 512B is isolated from the PA1 port 512A. Additionally, because the transistor 524B is turned on, the drain of the transistor 524B is pulled to ground, helping to protect the LNA2. Additionally, the matching/isolation network 532B may be configured to further isolate the LNA2 port 528B. For example, the matching/isolation network 532B may be configured to present a high impedance within a range of operation of the RX1, the TX1, and/or the TX2 when the drain of the transistor 524B is pulled to ground. Thus, most of the power of the signal from the PA1 goes to the antenna, as opposed to the LNA1 port 528A, the LNA2 port 528B, or the PA2 port 512B.

Similar to the transistor 304 in FIG. 4, the body node of the transistor 504A is left unconnected. To assist in bootstrapping the gate voltage, the drain voltage, the source voltage, and the body voltage of the transistor 504A and to help prevent latchup, the parasitic body resistance of the transistor 504A may be increased by isolating the transistor 504A on the IC in a manner similar to that described above with respect to the transistor 304.

Operation of the T/R switch device 478 during a first receive mode (i.e., RX1 receiving) will now be described. In the first receive mode, the TX1_EN signal may be set to ground, and the TX1_ENB signal may be set to $V_{DD}$. Also, an RX1_ENB signal coupled to the RX1_ENB port 554A may be set to ground. Further, a TX2_EN signal coupled to the TX2_EN port 552B may be set to ground, and a TX2_ENB signal coupled to the TX2_ENB port 564B may be set to $V_{DD}$. Additionally, an RX2_ENB signal coupled to the RX2_ENB port 554B may be set to $V_{DD}$. In response, the transistor 504A and the transistor 524A are turned off, and the drain of the transistor 504A is biased to $V_{DD}$. Because the transistor 504A is off, it isolates the PA1 from the antenna. Additionally, the matching network 532A matches the impedance of the antenna/BPF to the input impedance of the LNA1. Further, the transistor 504B is turned off, and the drain of the transistor 504B is biased to $V_{DD}$. Because the transistor 504B is off, it isolates the PA2 from the antenna. Also, the transistor 524B is turned on to isolate the LNA2 from the antenna. Additionally, as described above, the matching/isolation network 532B may be configured to further isolate the LNA2 port 528B when the transistor 524B is turned on.

A value of the resistor 560A may be selected to be relatively large so that only a small DC current may flow through the resistor 560A, the isolation circuit 568A, and into the diode circuit 580A. Because this current is small, the drain of the transistor 504A remains above approximately 1 volt, and the parasitic drain capacitance of the transistor 504A is minimized. Similarly, because the small current flows into the diode circuit 580A, the LNA1 port 528A is biased to above approximately 1 volt. Thus, the drain of the transistor 524A as well as the source of the transistor 504A also remain above approximately 1 volt. This biasing reduces the parasitic junction capacitance of the diode circuit 580A. Also during the first receive mode, the isolation circuit 568A and the isolation circuit 568B may act to further isolate the impedance of the PA1 and the PA2, respectively, from the antenna.

Further, similar to the transistor 324 in FIG. 4, the parasitic drain to body capacitance of the transistor 524A may be increased by isolating the transistor 524A on the IC in a manner similar to that described above with respect to the transistor 324.

In a second transmit mode (i.e., TX2 transmitting), a TX2_EN signal coupled to the TX2_EN port 552B may be set to a $V_{DD}$, and a TX2_ENB signal coupled to the TX2_ENB port 564B may be set to ground. Also, an RX2_ENB signal coupled to the RX2_ENB port 554B may be set to $V_{DD}$. Further, a TX1_EN signal coupled to the TX1_EN port 552A may be set to ground, and a TX1_ENB signal coupled to the TX1_ENB port 564A may be set to $V_{DD}$. Additionally, an RX1_ENB signal coupled to the RX1_ENB port 554A may be set to $V_{DD}$. In response, the transistor 504B and the transistor 524B are turned on, and the drain of the transistor 504B is biased to ground. Because the transistor 504B is on, there is a low impedance path between the PA2 port 512B and the antenna/BPF port 508. Further, the matching network 516B helps to match the output impedance of the PA2 with the impedance of the antenna 474/BPF 482. Additionally, because the transistor 524B is turned on, the drain of the transistor 524B is pulled to ground, helping to protect the LNA2. Additionally, the matching/isolation network 532B may be configured to further isolate the LNA2 port 528B. For example, the matching/isolation network 532B may be configured to present a high impedance within a range of operation of the RX1, the TX1, and/or the TX2 when the drain of the transistor 524B is pulled to ground. Similarly, the transistor 504A is turned off and the transistor 524A is turned on. Because the transistor 504A is off, the PA1 port 512A is isolated from the PA2 port 512B. Additionally, because the transistor 524A is turned on, the drain of the transistor 524A is pulled to ground, helping to protect the LNA1. Additionally, the matching/isolation network 532A may be configured to further isolate the LNA1 port 528A. For example, the matching/isolation network 532A may be configured to present a high impedance within a range of operation of the TX1, the RX2, and/or the TX2 when the drain of the transistor 524A is pulled to ground. Thus, most of the power of the signal from the PA2 goes to the antenna, as opposed to the LNA2 port 528B, the LNA1 port 528A, or the PA1 port 512A.

Similar to the transistor 304 in FIG. 4, the body node of the transistor 504B is left unconnected. To assist in bootstrapping the gate voltage, the drain voltage, the source voltage, and the body voltage of the transistor 504B and to help prevent latchup, the parasitic body resistance of the transistor 504B may be increased by isolating the transistor 504B on the IC in a manner similar to that described above with respect to the transistor 304.

Operation of the T/R switch device 478 during a second receive mode (i.e., RX2 receiving) will now be described. In the second receive mode, the TX2_EN signal may be set to ground, and the TX2_ENB signal may be set to $V_{DD}$. Also, an RX2_ENB signal coupled to the RX2_ENB port 554B may be set to ground. Further, a TX1_EN signal coupled to the TX1_EN port 552A may be set to ground, and a TX1_ENB signal coupled to the TX1_ENB port 564A may be set to $V_{DD}$. Additionally, an RX1_ENB signal coupled to the RX1_ENB port 554A may be set to $V_{DD}$. In response, the transistor 504B and the transistor 524B are turned off, and the drain of the transistor 504B is biased to $V_{DD}$. Because the transistor 504B is off, it isolates the PA2 from the antenna. Additionally, the matching network 532B matches the impedance of the antenna/BPF to the input impedance of the LNA2. Further, the transistor 504A is turned off, and the drain of the transistor 504A is biased to $V_{DD}$. Because the transistor 504A is off, it isolates the PA1 from the antenna. Also, the transistor 524A is turned on to isolate the LNA1 from the antenna. Additionally, as described above, the matching/isolation network 532A may be configured to further isolate the LNA1 port 528A when the transistor 524A is turned on.

A value of the resistor 560B may be selected to be relatively large so that only a small DC current may flow through the resistor 560B, the isolation circuit 568B, and into the diode circuit 580B. Because this current is small, the drain of the transistor 504B remains above approximately 1 volt, and the parasitic drain capacitance of the transistor 504B is minimized. Similarly, because the small current flows into the diode circuit 580B, the LNA2 port 528B is biased to above approximately 1 volt. Thus, the drain of the transistor 524B as well as the source of the transistor 504B also remain above approximately 1 volt. This biasing reduces the parasitic junction capacitance of the diode circuit 580B. Also during the first receive mode, the isolation circuit 568B and the isolation circuit 568A may act to further isolate the impedance of the PA2 and the PA1, respectively, from the antenna.

Further, similar to the transistor 324 in FIG. 4, the parasitic drain to body capacitance of the transistor 524B may be increased by isolating the transistor 524B on the IC in a manner similar to that described above with respect to the transistor 324.

Figure 8:
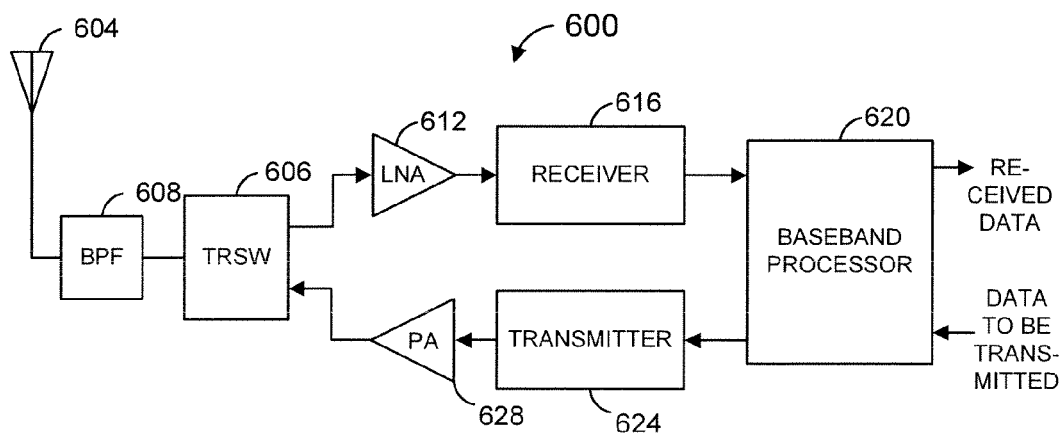
FIG. 8 is a block diagram of an example communication device that may utilize a transmit/receive switch such as any of the example transmit/receive switches disclosed herein.

FIG. 8 is a block diagram of an example radio 600 that may include a T/R switch such as any of the example T/R switches described above. The radio may be utilized with any of a variety of associated devices, such as a home networking device, a personal computer, a cellular telephone, a PDA, a personal gaming device, etc. The radio 600 may include an antenna 604 coupled to a T/R switch 606 via a band pass filter 608. Signals received by the antenna 604 and passed by the T/R switch 608 may be provided to an input of a low noise amplifier (LNA) 612. An output of the LNA 612 may be provided to a receiver 616 which converts the received signal to a baseband signal. The baseband signal may be provided to a baseband processor 620 which recovers the received data. The baseband processor 620 may provide the received data to a device associated with the radio. Similarly, the baseband processor 620 may receive data from the associated device that is to be transmitted by the radio 600. The baseband processor 620 may process the data and provide it to an input of a transmitter 624. An output of the transmitter 624 may be provided to an input of a power amplifier 628. An output of the power amplifier may be provided to the T/R switch 606, which in turn couples the output of the power amplifier 628 to the antenna 604 via the BPF 608.

Figure 9A:
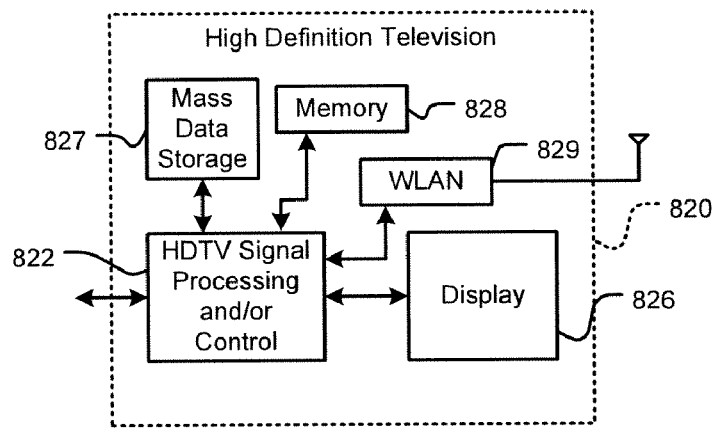
FIG. 9A is a block diagram of a high definition television that may utilize a T/R switch.

Referring to FIG. 9A, a T/R switch such as described above may be utilized in a high definition television (HDTV) 820. The HDTV 820 includes signal processing and/or control circuits, which are generally identified in FIG. 9A at 822, a WLAN interface 829, and a mass data storage 827. The T/R switch may be utilized in the WLAN interface 829, for example. HDTV 820 receives HDTV input signals in either a wired or wireless format and generates HDTV output signals for a display 826. In some implementations, signal processing circuit and/or control circuit 822 and/or other circuits (not shown) of HDTV 820 may process data, perform coding and/or encryption, perform calculations, format data and/or perform any other type of HDTV processing that may be required.

HDTV 820 may communicate with mass data storage 827 that stores data in a nonvolatile manner such as optical and/or magnetic storage devices. The mass data storage 827 may include one or more hard disk drives (HDDs) and/or one or more digital versatile disks (DVDs). One or more of the HDDs may be a mini HDD that includes one or more platters having a diameter that is smaller than approximately 1.8". HDTV 820 may be connected to memory 828 such as RAM, ROM, low latency nonvolatile memory such as flash memory and/or other suitable electronic data storage. HDTV 820 also may support connections with a WLAN via the WLAN network interface 829.

Figure 9B:
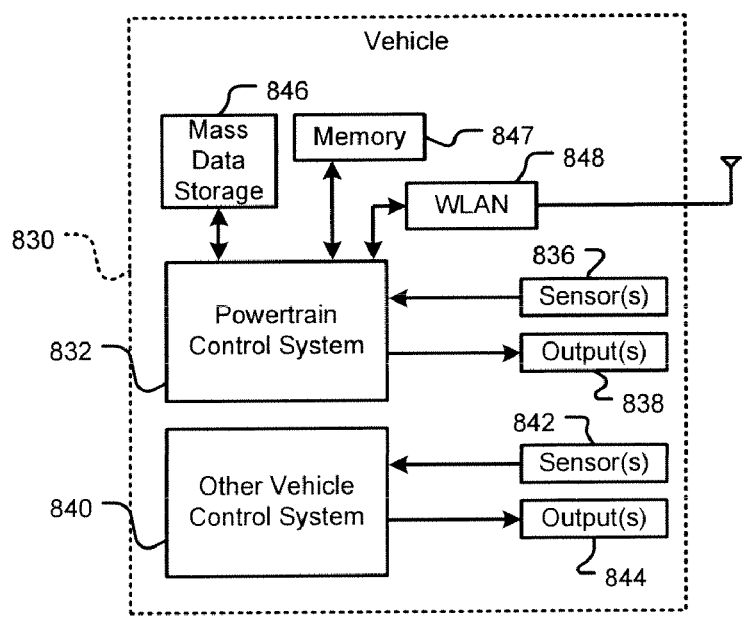
FIG. 9B is a block diagram of a vehicle that may utilize a T/R switch.

Referring now to FIG. 9B, a T/R switch such as described above may be utilized in a control system of a vehicle 830. A powertrain control system 832 receives inputs from one or more sensors such as temperature sensors, pressure sensors, rotational sensors, airflow sensors and/or any other suitable sensors and generates one or more output control signals such as engine operating parameters, transmission operating parameters, and/or other control signals.

A control system 840 may likewise receive signals from input sensors 842 and/or output control signals to one or more output devices 844. In some implementations, control system 840 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 832 may communicate with mass data storage 846 that stores data in a nonvolatile manner. Mass data storage 846 may include optical and/or magnetic storage devices for example hard disk drives HDD and/or DVDs. One or more of the HDDs may be a mini HDD that includes one or more platters having a diameter that is smaller than approximately 1.8". Powertrain control system 832 may be connected to memory 847 such as RAM, ROM, low latency nonvolatile memory such as flash memory and/or other suitable electronic data storage. Powertrain control system 832 also may support connections with a WLAN via a WLAN network interface 848. The T/R switch may be implemented in the WLAN interface 848, for example. The control system 840 may also include mass data storage, memory and/or a WLAN interface (all not shown).

Figure 9C:
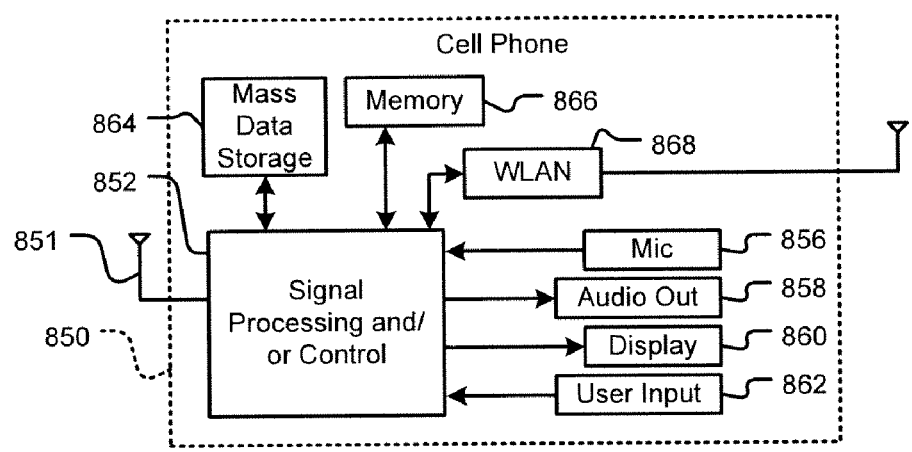
FIG. 9C is a block diagram of a cellular phone that may utilize a T/R switch.

Referring now to FIG. 9C, a T/R switch such as described above may be utilized in a cellular phone 850 that may include a cellular antenna 851. The cellular phone 850 includes signal processing and/or control circuits, which are generally identified in FIG. 9C at 852, a WLAN interface 868, and a mass data storage 864. The T/R switch may be implemented in the signal processing and/or control circuits 852 and/or the WLAN interface 868, for example. In some implementations, cellular phone 850 includes a microphone 856, an audio output 858 such as a speaker and/or audio output jack, a display 860 and/or an input device 862 such as a keypad, pointing device, voice actuation and/or other input device. Signal processing and/or control circuits 852 and/or other circuits (not shown) in cellular phone 850 may process data, perform coding and/or encryption, perform calculations, format data and/or perform other cellular phone functions.

Cellular phone 850 may communicate with mass data storage 864 that stores data in a nonvolatile manner such as optical and/or magnetic storage devices for example hard disk drives HDD and/or DVDs. At least one HDD may be a mini HDD that includes one or more platters having a diameter that is smaller than approximately 1.8". Cellular phone 850 may be connected to memory 866 such as RAM, ROM, low latency nonvolatile memory such as flash memory and/or other suitable electronic data storage. Cellular phone 850 also may support connections with a WLAN via a WLAN network interface 868.

Figure 9D:
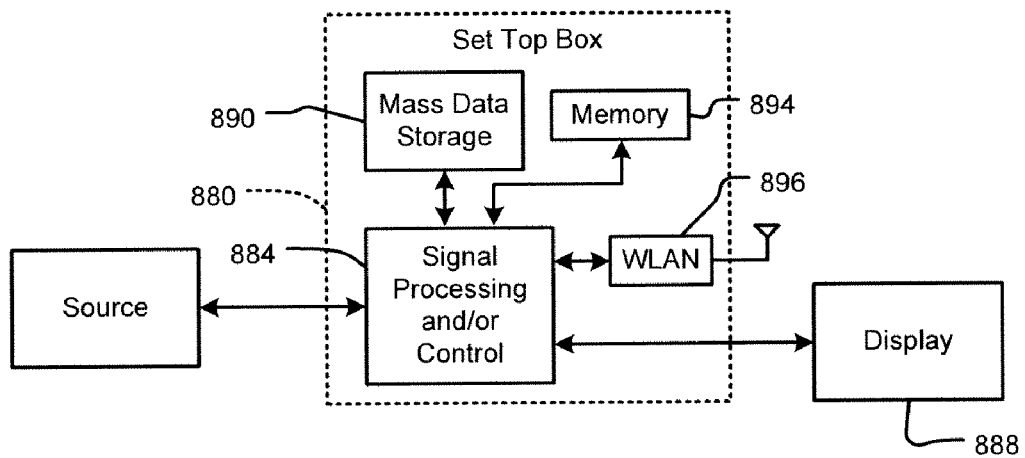
FIG. 9D is a block diagram of a set top box that may utilize a T/R switch.

Referring now to FIG. 9D, a T/R switch such as described above may be utilized in a set top box 880. The set top box 880 includes signal processing and/or control circuits, which are generally identified in FIG. 9D at 884, a WLAN interface 896, and a mass data storage device 890. The T/R switch may be implemented in the signal processing and/or control circuits 884 and/or the WLAN interface 896, for example. Set top box 880 receives signals from a source such as a broadband source and outputs standard and/or high definition audio/video signals suitable for a display 888 such as a television and/or monitor and/or other video and/or audio output devices. Signal processing and/or control circuits 884 and/or other circuits (not shown) of the set top box 880 may process data, perform coding and/or encryption, perform calculations, format data and/or perform any other set top box function.

Set top box 880 may communicate with mass data storage 890 that stores data in a nonvolatile manner. Mass data storage 890 may include optical and/or magnetic storage devices for example hard disk drives HDD and/or DVDs. At least one HDD may be a mini HDD that includes one or more platters having a diameter that is smaller than approximately 1.8". Set top box 880 may be connected to memory 894 such as RAM, ROM, low latency nonvolatile memory such as flash memory and/or other suitable electronic data storage. Set top box 880 also may support connections with a WLAN via a WLAN network interface 896.

Figure 9E:
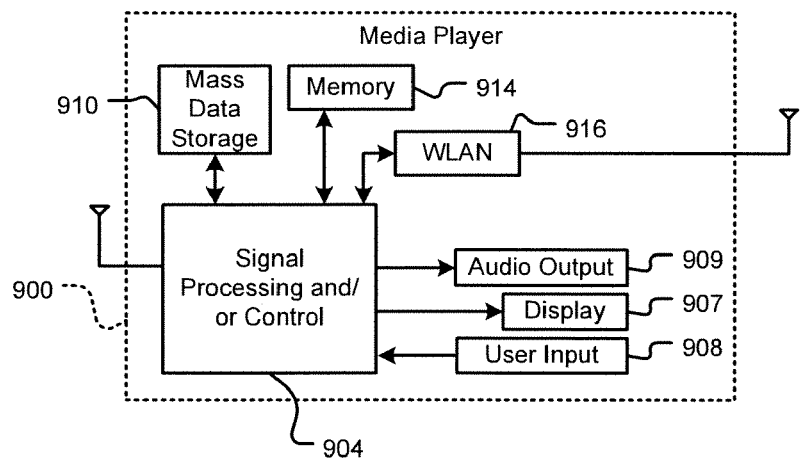
FIG. 9E is a block diagram of a media player that may utilize a T/R switch.

Referring now to FIG. 9E, a T/R switch such as described above may be utilized in a media player 900. The media player 900 may include signal processing and/or control circuits, which are generally identified in FIG. 9E at 904, a WLAN interface 916, and a mass data storage device 910. The T/R switch may be implemented in the signal processing and/or control circuits 904 and/or the WLAN interface 916, for example. In some implementations, media player 900 includes a display 907 and/or a user input 908 such as a keypad, touchpad and the like. In some implementations, media player 900 may employ a graphical user interface (GUI) that typically employs menus, drop down menus, icons and/or a point-and-click interface via display 907 and/or user input 908. Media player 900 further includes an audio output 909 such as a speaker and/or audio output jack. Signal processing and/or control circuits 904 and/or other circuits (not shown) of media player 900 may process data, perform coding and/or encryption, perform calculations, format data and/or perform any other media player function.

Media player 900 may communicate with mass data storage 910 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may be a mini HDD that includes one or more platters having a diameter that is smaller than approximately 1.8". Media player 900 may be connected to memory 914 such as RAM, ROM, low latency nonvolatile memory such as flash memory and/or other suitable electronic data storage. Media player 900 also may support connections with a WLAN via a WLAN network interface 916. Still other implementations in addition to those described above are contemplated.

Figure 9F:
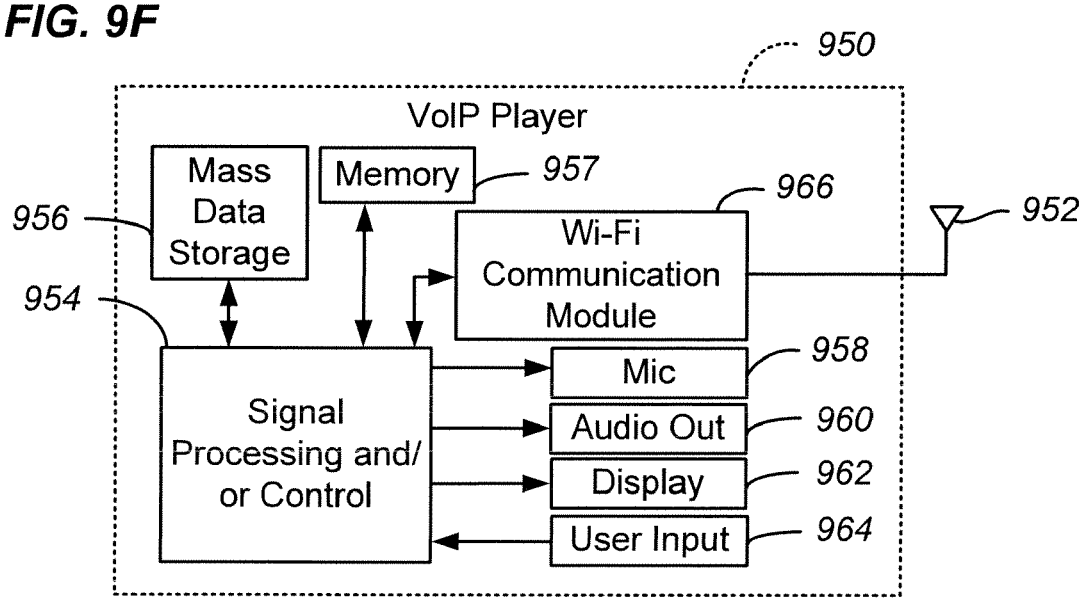
FIG. 9F is a block diagram of a voice over IP device that may utilize a T/R switch.

Referring to FIG. 9F, a T/R switch such as described above may be utilized in a Voice over Internet Protocol (VoIP) phone 950 that may include an antenna 954, signal processing and/or control circuits 958, a wireless interface 962, and a mass data storage 966. In some implementations, VoIP phone 950 includes, in part, a microphone 970, an audio output 974 such as a speaker and/or audio output jack, a display monitor 978, an input device 982 such as a keypad, pointing device, voice actuation and/or other input devices, and a Wireless Fidelity (Wi-Fi) communication module 962. The T/R switch may be implemented in the Wi-Fi communication module 962, for example. Signal processing and/or control circuits 958 and/or other circuits (not shown) in VoIP phone 950 may process data, perform coding and/or encryption, perform calculations, format data and/or perform other VoIP phone functions.

VoIP phone 950 may communicate with mass data storage 966 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 950 may be connected to memory 986, which may be a RAM, ROM, low latency nonvolatile memory such as flash memory and/or other suitable electronic data storage. VoIP phone 950 is configured to establish communications link with a VoIP network (not shown) via Wi-Fi communication module 962.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. An integrated transmit/receive switch device, comprising:
   a substrate;
   an antenna port to couple with an antenna;
   a transmitter port to couple with a transmitter;
   a receiver port to couple with a receiver;
   a receive path between the antenna port and the receiver port;
   a transmit path between the antenna port and the transmitter port, the transmit path including a first transistor on the substrate, the first transistor coupled in series between the antenna port and the transmitter port, wherein a body node of the first transistor is unconnected, and wherein the substrate is configured to provide a high impedance path from the first transistor to a reference voltage;
   a second transistor on the substrate, the second transistor coupled in series between the receiver port and the reference voltage.

2. An integrated transmit/receive switch device as defined in claim 1, wherein the first transistor is located on a floating body portion of the substrate such that a nearest area of the substrate having a low impedance coupling to the reference voltage is spaced apart from the first transistor.

3. An integrated transmit/receive switch device as defined in claim 2, wherein the substrate includes a guard ring that separates the floating body portion from at least some other portion of the substrate.

4. An integrated transmit/receive switch device as defined in claim 2, wherein the second transistor is located on a second transistor body portion of the substrate wherein the second transistor is located on the second transistor body portion such that a nearest area of the substrate having a low impedance coupling to the reference voltage is spaced apart from the second transistor.

5. An integrated transmit/receive switch device as defined in claim 1, wherein the second transistor is located on a second transistor body portion of the substrate wherein the second transistor is located on the second transistor body portion such that a nearest area of the substrate having a low impedance coupling to the reference voltage is spaced apart from the second transistor.

6. An integrated transmit/receive switch device as defined in claim 5, wherein the substrate includes a guard ring that separates the second transistor body portion from at least some other portion of the substrate.

7. An integrated transmit/receive switch device as defined in claim 1, further comprising an isolation network coupled between a drain of the first transistor and a source of the first transistor, wherein the isolation network is configured to present a high impedance, at least at a frequency range of operation of the receiver.

8. An integrated transmit/receive switch device as defined in claim 7, wherein the isolation network comprises:
a capacitive element coupled between the drain of the first transistor and the source of the first transistor; and
an inductive element coupled between the drain of the first transistor and the source of the first transistor.

9. An integrated transmit/receive switch device as defined in claim 7, further comprising a diode circuit coupled between a drain of the second transistor and the reference voltage; and
a biasing circuit to bias the diode circuit when the second transistor is on.

10. An integrated transmit/receive switch device as defined in claim 9, wherein the diode circuit comprises:
a plurality of first diodes coupled in series in a same orientation between the drain of the second transistor and the reference voltage; and
a second diode coupled between the drain of the second transistor and the reference voltage in an orientation different than the orientation of the first diodes.

11. An integrated transmit/receive switch device as defined in claim 9, wherein the biasing circuit comprises a biasing resistive element coupled between the drain of the first transistor and a control signal port.

12. An integrated transmit/receive switch device as defined in claim 7, wherein the receive path includes a matching network coupled between the antenna port and the receiver port.

13. An integrated transmit/receive switch device as defined in claim 12, wherein the matching network is configured to present a high impedance, at least at a frequency range of operation of the transmitter, when the second transistor is turned on.

14. An integrated transmit/receive switch device as defined in claim 13, wherein the matching network comprises:
a first capacitive element coupled between the antenna port and the reference voltage;
an inductive element coupled between the antenna port and the receiver port; and
a second capacitive element coupled between the antenna port and the receiver port.

15. An integrated transmit/receive switch device as defined in claim 1, wherein the antenna port is to couple with the antenna via a band pass filter;
wherein the transmitter port is to couple with the transmitter via a power amplifier; and
wherein the receiver port is to couple with the receiver via a low noise amplifier.

16. An integrated transmit/receive switch device, comprising:
a substrate;
an antenna port to couple with an antenna;
a transmitter port to couple with a transmitter;
a receiver port to couple with a receiver;
a receive path between the antenna port and the receiver port;
a transmit path between the antenna port and the transmitter port, the transmit path including a first transistor on the substrate, the first transistor coupled in series between the antenna port and the transmitter port;
an isolation network coupled between a drain of the first transistor and a source of the first transistor, wherein the isolation network is configured to present a high impedance, at least at a frequency range of operation of the receiver; and
a second transistor on the substrate, the second transistor coupled in series between the receiver port and a reference voltage.

17. An integrated transmit/receive switch device as defined in claim 16, wherein the isolation network comprises:
a capacitive element coupled between the drain of the first transistor and the source of the first transistor; and
an inductive element coupled between the drain of the first transistor and the source of the first transistor.

18. An integrated transmit/receive switch device as defined in claim 16, wherein a body node of the first transistor is unconnected, and wherein the substrate is configured to provide a high impedance path to the reference voltage.

19. An integrated transmit/receive switch device as defined in claim 18, wherein the first transistor is located on a floating body portion of the substrate such that a nearest area of the substrate having a low impedance coupling to the reference voltage is spaced apart from the first transistor.

20. An integrated transmit/receive switch device as defined in claim 16, wherein a body of the first transistor is located in a deep n-well (DNW), and wherein a body node of the first transistor is coupled to the reference voltage via a resistive element.

21. An integrated transmit/receive switch device as defined in claim 16, wherein a body node of the first transistor is coupled to the reference voltage via an LC-tank circuit, wherein the LC-tank circuit is configured to present a high impedance, at least at a frequency range of operation of the transmitter.

22. An integrated transmit/receive switch device as defined in claim 16, further comprising a diode circuit coupled between a drain of the second transistor and the reference voltage; and
a biasing circuit to bias the diode circuit when the second transistor is on.

23. An integrated transmit/receive switch device as defined in claim 22, wherein the diode circuit comprises:
a plurality of first diodes coupled in series in a same orientation between the drain of the second transistor and the reference voltage; and
a second diode coupled between the drain of the second transistor and the reference voltage in an orientation different than the orientation of the first diodes.

24. An integrated transmit/receive switch device, comprising:
a substrate;
an antenna port to couple with an antenna;
a transmitter port to couple with a transmitter;

a receiver port to couple with a receiver;
a receive path between the antenna port and the receiver port;
a transmit path between the antenna port and the transmitter port, the transmit path including a first transistor on the substrate, the first transistor coupled in series between the antenna port and the transmitter port;
a second transistor on the substrate, the second transistor coupled in series between the receiver port and a reference voltage;
a diode circuit coupled between a drain of the second transistor and the reference voltage; and
a biasing circuit to bias the diode circuit when the second transistor is on.

25. An integrated transmit/receive switch device as defined in claim 24, wherein the diode circuit comprises:
a plurality of first diodes coupled in series in a same orientation between the drain of the second transistor and the reference voltage; and
a second diode coupled between the drain of the second transistor and the reference voltage in an orientation different than the orientation of the first diodes.

26. An integrated transmit/receive switch device as defined in claim 25, further comprising a low impedance path at DC between a drain of the first transistor and a source of the first transistor;
wherein the biasing circuit comprises a biasing resistive element coupled between the drain of the first transistor and a control signal port.

27. An integrated transmit/receive switch device as defined in claim 24, wherein a body node of the first transistor is unconnected, and wherein the substrate is configured to provide a high impedance path to the reference voltage.

28. An integrated transmit/receive switch device as defined in claim 27, wherein the first transistor is located on a floating body portion of the substrate such that a nearest area of the substrate having a low impedance coupling to the reference voltage is spaced apart from the first transistor.

29. An integrated transmit/receive switch device as defined in claim 24, wherein a body of the first transistor is located in a deep n-well (DNW), and wherein a body node of the first transistor is coupled to the reference voltage via a resistive element.

30. An integrated transmit/receive switch device as defined in claim 24, wherein a body node of the first transistor is coupled to the reference voltage via an LC-tank circuit, where in the LC-tank circuit is configured to present a high impedance, at least at a frequency range of operation of the transmitter.

31. A communication device, comprising:
a transmitter having an output;
a power amplifier having an input coupled to the output of the transmitter, and having an output;
a low noise amplifier having an input and an output;
a receiver having an input coupled to the output of the low noise amplifier;
an antenna;
a transmit/receive switch having a first port coupled to the input of the low noise amplifier, a second port coupled to the output of the power amplifier, and a third port coupled to the antenna, wherein the transmit/receive switch comprises:
a substrate;
a receive path between the third port and the first port;
a transmit path between the third port and the second port, the transmit path including a first transistor on the substrate, the first transistor coupled in series between the third port and the second port, wherein a body node of the first transistor is unconnected, and wherein the substrate is configured to provide a high impedance path from the first transistor to a reference voltage;
a second transistor on the substrate, the second transistor coupled in series between the first port and the reference voltage.

32. A communication device, comprising:
a transmitter having an output;
a power amplifier having an input coupled to the output of the transmitter, and having an output;
a low noise amplifier having an input and an output;
a receiver having an input coupled to the output of the low noise amplifier;
an antenna;
a transmit/receive switch having a first port coupled to the input of the low noise amplifier, a second port coupled to the output of the power amplifier, and a third port coupled to the antenna, wherein the transmit/receive switch comprises:
a substrate;
a receive path between the third port and the first port;
a transmit path between the third port and the second port, the transmit path including a first transistor on the substrate, the first transistor coupled in series between the third port and the second port;
an isolation network coupled between a drain of the first transistor and a source of the first transistor, wherein the isolation network is configured to present a high impedance, at least at a frequency range of operation of the receiver; and
a second transistor on the substrate, the second transistor coupled in series between the first port and a reference voltage.

33. A communication device, comprising:
a transmitter having an output;
a power amplifier having an input coupled to the output of the transmitter, and having an output;
a low noise amplifier having an input and an output;
a receiver having an input coupled to the output of the low noise amplifier;
an antenna;
a transmit/receive switch having a first port coupled to the input of the low noise amplifier, a second port coupled to the output of the power amplifier, and a third port coupled to the antenna, wherein the transmit/receive switch comprises:
a substrate;
a receive path between the third port and the first port;
a transmit path between the third port and the second port, the transmit path including a first transistor on the substrate, the first transistor coupled in series between the third port and the second port;
a second transistor on the substrate, the second transistor coupled in series between the receiver port and a reference voltage;
a diode circuit coupled between a drain of the second transistor and the reference voltage; and
a biasing circuit to bias the diode circuit when the second transistor is on.

* * * * *